United States Patent

Toyama

[11] Patent Number: 5,732,477
[45] Date of Patent: Mar. 31, 1998

[54] PROCESS FOR ULTRAVIOLET CURING

[76] Inventor: Hideo Toyama, 2-3-19 Kirehigashi, Hiranoku-ku, Osaka, Japan

[21] Appl. No.: 713,142
[22] Filed: Sep. 12, 1996
[51] Int. Cl.⁶ .................................... F26B 3/34
[52] U.S. Cl. .................... 34/275; 34/273; 34/278; 34/274
[58] Field of Search .............. 34/266, 267, 268, 34/273, 274, 275, 276, 278, 277

[56] References Cited

U.S. PATENT DOCUMENTS

| | | | |
|---|---|---|---|
| 1,646,010 | 10/1927 | Clover | 34/275 |
| 3,894,343 | 7/1975 | Pray et al. | 34/278 |
| 4,143,468 | 3/1979 | Novotny et al. | 34/276 |
| 4,299,362 | 11/1981 | Baldinger | 34/273 |
| 4,665,627 | 5/1987 | Wilde et al. | 34/278 |
| 4,697,355 | 10/1987 | Mino et al. | 34/274 |

FOREIGN PATENT DOCUMENTS 970051  10/1982  U.S.S.R. ................ 34/275

Primary Examiner—Henry A. Bennett
Assistant Examiner—Dinnatia Doster

[57] ABSTRACT

The disclosed invention is an ultraviolet curing process that causes a wrinkle pattern to appear on the surface of a curing layer. Initially, the primary stage of the process is generated by irradiating a photopolymerizable layer with far ultraviolet light wherein the dominant wavelength emitted is 254 nanometers. Then, the second stage of the process is performed by heating the photopolymerizable layer. Finally, the third stage of the process irradiates the layer with high pressure vapor ultraviolet light.

4 Claims, 1 Drawing Sheet

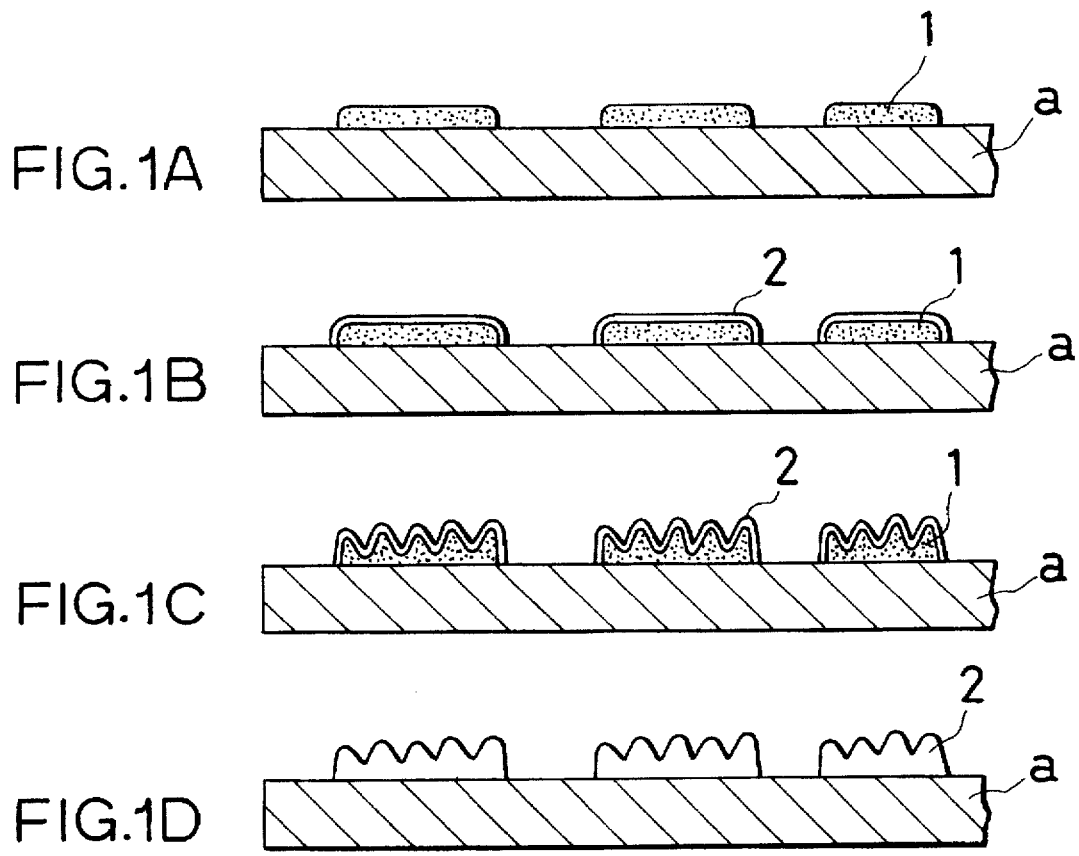
FIG.1A
FIG.1B
FIG.1C
FIG.1D
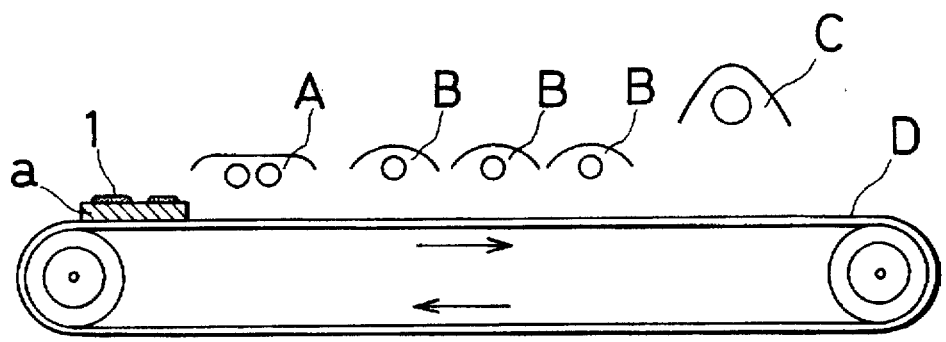
FIG.2

PROCESS FOR ULTRAVIOLET CURING

BACKGROUND OF THE INVENTION

FIELD OF THE INVENTION

The present invention relates to a process for a ultraviolet curing, which is capable of appearing a wrinkle pattern on a surface of a ultraviolet curing layer efficiently and it's layer excellent in the adhesion.

DISCUSSION OF BACKGROUND

In recent years, it is made popular in a field of interiors that a wrinkle pattern on printing and coating surfaces in drying process are advanced in design. Such drying processes are applied by the following generally:

(A) As a vehicle of Oxidizing reaction, for example unsaturated fatty oil, reacts from its surface, a wrinkle pattern is made by moving a layer of the vehicle in half-reaction condition.

(B) In a reaction of addition reaction, for example urethan resin and epoxy resin, and condensed reaction, for example amino resin, a wrinkle pattern is made by moving a layer of the vehicle to react the surface with its accelerator.

(C) In a reaction of radical reaction, for example unsaturated polyester resin, addition reaction, for example urethan resin and epoxy resin, and condensed reaction, for example amino resin, a wrinkle pattern is made by moving a layer of the vehicle to prevent the interface with its inhibitor.

(D) In a curing of photopolymerizable compositions, a wrinkle pattern is made by irradiating in an atmosphere of Nitrogen.

By the method (A), it is used in a field of craftworks traditionally. However, it is puzzled and exhibits poor productivity and reproduction.

By the method (B), it is difficult to appear a constant wrinkle pattern because of a uncontrollable problem in its reaction under the various environments.

By the method (C), it appears a constant wrinkle pattern. However, it is difficult to provide a constant reactibity and exhibits poor adhesion because of a inhibitor of the interface.

By the method (D), it exhibits poor design. Because, its wrinkle pattern is very tiny due to be made by moving a vehicle to cure in a moment. Moreover, it exhibits high cost for Nitrogen.

Whereas conventional methods appearing a wrinkle pattern have various defects, it is desired the method exhibiting excellent productivity, reproduction and design.

SUMMARY OF THE INVENTION

It is an object of the present invention to overcome the drawbacks of the conventional techniques and to provide a method appearing a wrinkle pattern on a surface of a curing layer efficiently.

It is another object of the present invention to provide a method exhibitting energy-saving, pollution free operation and conservation of resources, which is adopted common ultraviolet curing as a drying process.

The present invention provides a process for ultraviolet curing in order to cure a photopolymerizable composition comprising:

The primary stage of the process;

A layer of a photopolymerizable composition is irradiated with far ultraviolet light which the dominant wavelength emitted is 254 nanometers (nm).

The secondary stage of the process;
The layer is heated.

The third stage of the process;
The layer is irradiated with high pressure vapour ultraviolet light.

BRIEF DESCRIPTION OF THE DRAWINGS

The invention disclosed herein will be understood better with reference to the following drawings of which;

FIGS. 1A–1D are an outline of processes employed in the present invention.

FIG. 1A; A state of forming a layer of a photopolymerizable composition on a substrate.

FIG. 1B; A state of irradiating the layer with far ultraviolet light.
the primary stage of the process FIG. 1C; A state of heating the layer with far infrared rays.
the secondary stage of the process FIG. 1D; A state of irradiating the layer with high pressure vapour ultraviolet light.
the third stage of the process FIG. 2 is a outline of radiation curing equipment employed in the present invention.

Referring to FIG. 1 and FIG. 2, there are shown substrate (a), uncured photopolymerizable composition (1), cured photopolymerizable composition (2), far ultraviolet lamp (A), far infrared rays lamp (B), high pressure vapour ultraviolet lamp (C), conveyer (D).

DETAILED DESCRIPTION OF THE PREFERRED EMBODIMENTS

The substrate to be coated or printed may be of various types which is used in their field popularly; for example, various plastic, paper, textile, wood, porcelain, concrete and metal substrates forming board and sheet like materials. Further, such a substrate may be the one subjected to preliminary treatment.

The photopolymerizable composition of the present invention is contained a photopolymerizable vehicle and a photoinitiator essentially.

Further, when it is desired, an inert polymer, a color pigment, a exteder pigment, solvent and additives may be contained.

Referring to a photopolymerizable vehicle, the vehicle includes broadly a radical polymerizable unsaturated double bond in their molecules.

The vehicle is composed of a reactive polymer, oligomer and diluent. As such a reactive polymer and oligomer, unsaturated polyester prepolymer, epoxy acrylate oligomer, urethane acrylate oligomer, polyester acrylate oligomer and polyether acrylate oligomer may be mentioned as typical examples. As such a reactive diluent, styrene, vinyl acetate, 2-ethylhexyl (meth)acrylate, 1,6-hexanediol di(meth) acrylate, polyethylene glycol di(meth)acrylate, trimethylol propane tri(meth)acrylate and dipentaerythritol hexa(meth) acrylate may be mentioned as typical examples.

Referring to another photopolymerizable vehicle, the vehicle includes photoionic polymerizable resins.

The vehicle is composed of a reactive oligomer and diluent. As such a reactive oligomer, cyclo epoxy, glycidyl ether epoxy, epoxy (meth)acrylate and vinyl ether compounds may be mentioned as typical examples. As such a reactive diluent, epoxy monomer, vinyl ether and cyclo ether may be mentioned as typical examples.

Referring to a photoinitiator, as such a photoinitiator, benzophenone, benzoin, benzoin ethers, 2-chloro thioxanthone, etc. and other thioxanthone compounds, 1-hydroxy dimethyl phenyl ketone, 2-methyl-4-methylthio-2-molpholyno propylphenone, etc. and other acetophenone compounds and 2.4.6-trimethyl benzoyl diphenyl phosphine oxide may be mentioned as typical examples.

Referring to a photoionic-initiator(catalyst), as such a photoinitiator, aryldiazonium salt, triarylsulphonium salt and sulfonic ester may be mentioned as typical examples.

As a photoinitiator is selected for a photopolymerizable composition, a photo-absorption of the photoinitiator is very important to appear a wrinkle pattern on a surface of a curing layer efficiently.

This invention was composed from two fact of ultraviolet curing. Firstly, a photopolymerization of a layer starts to take place in a surface increment. Secondly, a penetration depth of light depends on wavelengths. As well-known, a penetration depth of shoter wavelength rays is shallower. However it is not specified the specific wavelength to cure a surface increment of a layer efficiently and appear a wrinkle pattern.

Under this circumstances, I confirm through experiments that a irradiation with far ultraviolet light, which the dominant wavelength emitted is 254 nm, can cure a surface increment of a layer efficiently.

As a photoinitiator of this invention has to have absorption of these wavelengths essentially, a large number of commercial photoinitiators have large and small absorption of these wavelengths.

Further, under the secondary stage of the process, a wrinkle pattern is taken place with heat because of a convection in bulk of layer.

Further, under the third stage of the process, a layer is irradiated with high pressure vapour ultraviolet light aimed to fully cure a layer and fix a wrinkle pattern.

A curing layer of this invention has a large curing strain and a poor adhesion comparing with one of a conventional curing method becouse of a pre-curing surface of a layer; the primary stage of the process.

Under this circumstances, I confirm through experiments that it is effective a Metal Halide Lamp for a good adhesion which has a characteristic spectrum of a deep penetration depth and that it is effective a photoinitiator for a good adhesion which has a characteristic max. UV absorption, more than 300 nm.

The vehicle is composed a inert polymer. As such a inert polymer, acryl resin, epoxy resin, polyurethane resin, polyester resin, and cellulose resin may be mentioned as typical examples.

The vehicle is composed a tinting pigment and a extender pigment.

As such a tinting pigment, titanium white, carbon black, zinc sulfide, iron oxide and phthalocyanine blue may be mentioned as typical examples.

As such a extender pigment, silica sand, silicate, calcium carbonate, talc, flaky glass and a powder of a resin such as polyurethane, polyester may be mentioned as typical examples.

Further, a solvent is usually employed to adjust the viscosity for printing or coating. As such a solvent, toluene, xylene, ethyl acetate and methyl ethyl ketone may be mentioned as typical examples.

Now, a process for forming a printing or a coating according to the present invention will be applied various types which is applied in their field popularly.

As such a printing method, silk screen, gravure and flexogravure printing may be mentioned as typical examples.

As such a coating method, roll coater, flow coater, spray gun and pattern roller coating may be mentioned as typical examples.

Now, a drying process, three stage of process, according to the present invention will be described.

The primary stage of the process;

A layer of a photopolymerizable composition is irradiated with far ultraviolet light which the dominant wavelength emitted is 254 nanometers (nm).

As such a photosource above-mentioned, a pasteurized lamp, a low pressure mercury vapour lamp, a high power low pressure mercury vapour lamp and a high pressure mercury vapour lamp constracted a interfered filter, that the dominant wavelength emitted is 254 nm, may be mentioned as typical examples.

A low pressure mercury vapour lamp is particularly suitable due to its efficancy and economicaly.

In the secondary stage of the process the layer is heated.

As such a heating source infrared rays lamp and a far infrared rays lamp may be mentioned as typical examples.

A far infrared rays lamp is particularly suitable.

In the third stage of the process the layer is irradiated with high pressure vapour ultraviolet light.

As such a photosource, a high pressure mercury vapour lamp and a metal halide lamp may be mentioned as typical examples.

As mentioned above, a metal halide lamp is particularly suitable.

Now, the present invention will be described in further detail with reference to examples. However, it should be understood that the present invention is by no means restricted by such specific examples. In the examples, "parts" mean "parts by weight".

| Preparation of photopolymerizable blend composition A | |
|---|---|
| Urethane Acrylate oligomer (Art resin UN-1255 Supplier; NEGAMI INDUSTRIAL Co. LTD) | 70 parts |
| 1,6 Hexane Diacrylate | 30 parts |
| 1-Hydroxycyclohexyl acetophenone (Irgacure 184 Max. UV absorption 331 nm Supplier; CIBA GEIGY) | 3 parts |
| Deformer (polyflow AC303 Supplier; KYOEISHA chemical Co. LTD) | 1 parts |
| Preparation of photopolymerizable blend composition B | |
| Urethane Acrylate oligomer (Art resin UN-1255 Supplier; NEGAMI INDUSTRIAL Co. LTD) | 70 parts |
| 1,6 Hexane Diacrylate | 30 parts |
| Methyl benzoyl formate (Vicure 55 Max. Uv absorption 250 nm Supplier; STAUFFER CHEMICAL Co.) | 3 parts |
| Deformer (polyflow AC303 Supplier; KYOEISHA chemical Co. LTD) | 1 parts |

EXAMPLE 1

A photopolymerizable blend composition A was screen-printed to a transparent PVC sheet by a 100 mesh flower patterned silk screen. Then, a printed sheet was passed under the radiation curing equipment (FIG. 2) at a passing speed of 5 m/min. Rererring to a detail of the equipment, a far ultraviolet lamp (A) was applied a low pressure mercury vapour lamp (UVL-SUV90S 100V peak wavelength; 254 nm Supplier; SEN LIGHT Co.,LTD) a far infrared rays lamp (B) (IRS206 lamp 200V Supplier;TOSHIBA LIGHTING & TECHNOLOGY Co.) and a high pressure vapour ultraviolet lamp (C) was applied a high pressure marcury vapour lamp (HI-40N lamp Out put power 80 W/cm Supplier; JAPAN STORAGE BATTERY Co.,LTD.)

The obtained printing sheet had a transparent flower pattern which appeared a wrinkle pattern on a surface. It seemed more stereoscopic and high performance. It had good adhesion by a adhesive tape test, but a part of a printing layer was peeled off by a folding test.

EXAMPLE 2

The printing and curing were conducted under the same conditions as in EXAMPLE 1 except that instead of the high pressure marcury vapour lamp in EXAMPLE 1, a metal halide lamp (MB-40N lamp Out put power 80 W/cm Supplier; JAPAN STORAGE BATTERY Co.,LTD.) was applied. It had same good apperance and good adhesion by a adhesive tape test and a folding test.

EXAMPLE 3

The printing and curing were conducted under the same conditions as in EXAMPLE 1 except that instead of the low pressure mercury vapour lamp in EXAMPLE 1, same high pressure mercury vapour lamp constracted a interfered filter, that the dominant wavelength emitted is 254 nm, was applied.

It had same good apperance and same adhesion.

COMPARATIVE EXAMPLE 1

The printing and curing were conducted under the same conditions as in EXAMPLE 1 except that the low pressure mercury vapour lamp was omitted. The obtained printing sheet had a transparent flower pattern which didn't appear a wrinkle pattern on a surface at all.

COMPARATIVE EXAMPLE 2

The printing and curing were conducted under the same conditions as in EXAMPLE 1 except that the far infrared rays lamp was omitted.

The obtained printing sheet had a flat transparent flower pattern which didn't appear as a wrinkle pattern on a surface at all.

Further, after irradiatting a low pressure mercury vapour lamp, the printing sheet was taken away and put on a table. It was appeared as a irregular wrinkle pattern on a surface after 60 seconds

COMPARATIVE EXAMPLE 3

The printing and curing were conducted under the same conditions as in EXAMPLE 3 except that the interfered filter was omitted. (peak wavelength; 365 nm)

The obtained printing sheet had a flat transparent flower pattern which didn't appear as a wrinkle pattern on a surface at all.

COMPARATIVE EXAMPLE 4

The printing and curing were conducted under the same conditions as in EXAMPLE 2 except that in EXAMPLE 2, the photopolymerizable blend composition A was changed to a photopolymerizable blend composition B.

The obtained printing sheet had a transparent flower pattern which appeared as a smaller wrinkle pattern on a surface than EXAMPLE 2. It seemed less stereoscopic and lower performance. It had bad adhesion by a adhesive tape test and all of a printing layer was peeled off by a folding test.

What is claimed is:

1. A process for ultraviolet curing in order to cure a photopolymerizable composition comprising:

(1) The primary stage of the process;
    A layer of a photopolymerizable composition is irradiated with far ultraviolet light which the dominant wavelength emitted is 254 nanometers (nm)

(2) The secondary stage of the process;
    The layer is heated (3) The third stage of the process;
    The layer is irradiated with high pressure vapour ultraviolet light.

2. A process for ultraviolet curing in order to cure a photopolymerizable composition according to claim 1, wherein the high pressure vapour ultraviolet light is emitted with a metal halide lamp.

3. A process for ultraviolet curing in order to cure a photopolymerizable composition according to claim 1, wherein the layer is heated by a far infrared rays lamp.

4. A process for ultraviolet curing in order to cure a photopolymerizable composition according to claim 1, wherein a photoinitiator of the photopolymerizable composition has a max.UV absorption, more than 300 nm.

* * * * *